United States Patent
Boyce et al.

(10) Patent No.: US 6,246,801 B1
(45) Date of Patent: Jun. 12, 2001

(54) METHOD AND APPARATUS FOR GENERATING SELECTED IMAGE VIEWS FROM A LARGER IMAGE HAVING DEPENDENT MACROBLOCKS

(75) Inventors: Jill MacDonald Boyce, Manalapan; David Gray Boyer, Oceanport, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/036,141

(22) Filed: Mar. 6, 1998

(51) Int. Cl.[7] ........................................... G06K 9/36
(52) U.S. Cl. .................................................. 382/248
(58) Field of Search .................... 358/432, 433; 382/248, 250, 235; 348/384, 385, 392

(56) References Cited

U.S. PATENT DOCUMENTS

| | | | |
|---|---|---|---|
| 5,262,855 | * 11/1993 | Alattar et al. | 358/133 |
| 5,442,400 | * 8/1995 | Sun et al. | 348/402 |
| 5,481,297 | * 1/1996 | Cash et al. | 348/385 |
| 5,533,138 | * 7/1996 | Kim et al. | 382/232 |
| 5,623,308 | * 4/1997 | Civanlar et al. | 348/392 |
| 5,657,092 | * 8/1997 | Kim | 348/565 |
| 5,666,487 | * 9/1997 | Goodman et al. | 348/384 |
| 5,878,168 | * 3/1999 | Kondo et al. | 382/232 |
| 5,912,742 | * 6/1999 | Matoba et al. | 358/426 |

* cited by examiner

Primary Examiner—Jerome Grant, II
(74) Attorney, Agent, or Firm—Ryan, Mason & Lewis, LLP

(57) ABSTRACT

A selected image view generator is disclosed for generating a selected portion of a larger compressed image. A selected image view from an overall image is generated with significantly reduced computation and reduced latency (for video processing). Frame insensitivity permits selected image views to be formed from static images or from a video stream. Multiple users can simultaneously control a selected view received from an image source. Remote cameras can be panned electronically, rather than physically. The overall compressed image may be encoded using a suitable intra-frame macroblock-based image encoder. A portion of the DC coefficient values are recomputed when generating the selected image view from the overall image, to reflect the reordering of the pixels in the selected image view (that results in a portion of the pixels being adjacent to different pixels than they were in a subimage). Each transmitted overall image and selected image view optionally includes a frame header indicating the number of macroblocks in the transmitted image.

44 Claims, 10 Drawing Sheets

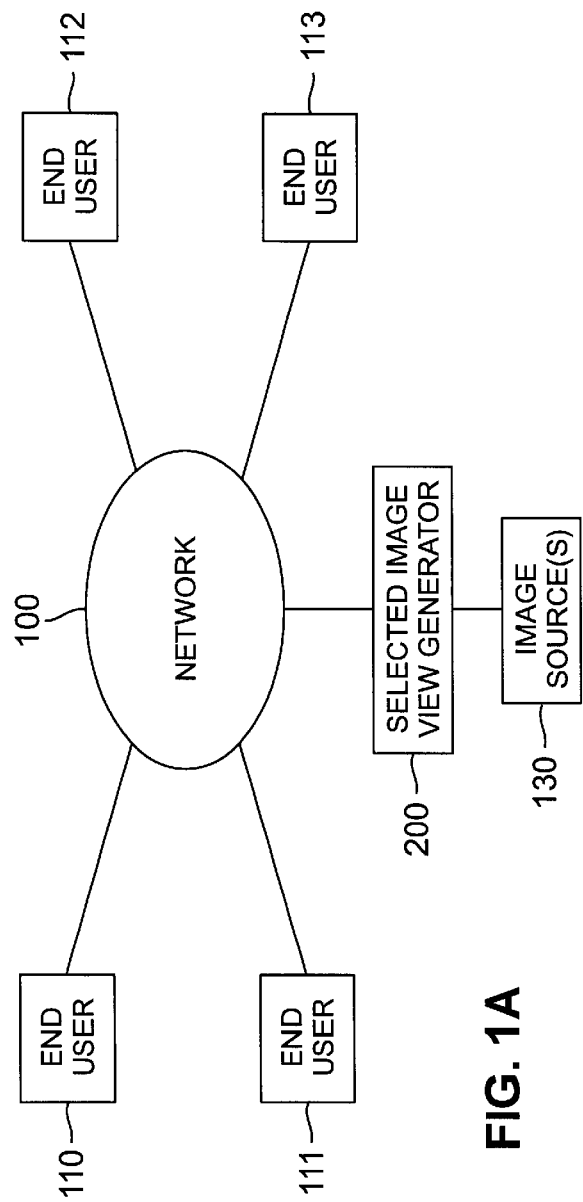
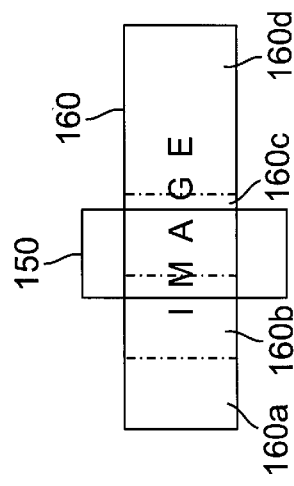
FIG. 1A
FIG. 1B

| CATEGORY | DC DIFFERENCE VALUES / AC COEFFICIENTS | | | | |
|---|---|---|---|---|---|
| 0 | | | 0 | | |
| 1 | | −1 | | 1 | |
| 2 | | −3 ... −2 | | 2 ... 3 | |
| 3 | −7 ... | | | ... | 7 |
| 4 | −15 ... | −8 | | 8 | ... 15 |
| 5 | −31 ... | −16 | | 16 | ... 31 |
| 6 | −63 ... | −32 | | 32 | ... 63 |
| 7 | −127 ... | −64 | | 64 | ... 127 |
| 8 | −255 ... | −128 | | 128 | ... 255 |
| 9 | −511 ... | −256 | | 256 | ... 511 |
| 10 | −1023 ... | −512 | | 512 | ... 1023 |
| 11 | −2047 ... | −1024 | | 1024 | ... 2047 |
| 12 | −4095 ... | −2048 | | 2048 | ... 4095 |
| 13 | −8191 ... | −4096 | | 4096 | ... 8191 |
| 14 | −16383 ... | −8192 | | 8192 | ... 16383 |
| 15 | −32767 ... | −16384 | | 16384 | ... 32768 |
| 16 | | | 32768 | | |

FIG. 4

DC DETECTION TABLE 500

| LOOKUP CODE (HEX) 520 | LUMINANCE DC DIFFERENCE CATEGORY / CODE LENGTH 530 | CHROMINANCE DC DIFFERENCE CATEGORY / CODE LENGTH 540 |
|---|---|---|
| 00 | 0/2 | 0/2 |
| 01 | 0/2 | 0/2 |
| 02 | 0/2 | 0/2 |
| ... | ... | ... |
| FE | 10/18 | 8/16 |
| FF | ESCAPE | ESCAPE |

FIG. 5

AC ENCODING TABLE

| RUN / LENGTH | CODEWORD |
|---|---|
| 0/1 | 00 |
| 0/2 | 01 |
| 0/3 | 100 |
| 0/4 | 1011 |
| . . . | . . . |
| F/3 | 1111111111110111 |
| F/4 | 1111111111111000 |
| F/5 | 1111111111111001 |
| . . . | . . . |

FIG. 6

AC DETECTION TABLE

| LOOKUP CODE (HEX) | LUMINANCE RUN / LENGTH (HEX) | CHROMINANCE RUN / LENGTH (HEX) |
|---|---|---|
| 0000 | | |
| 0001 | | |
| 0002 | | |
| ... | ... | ... |
| E280 | 0306 | 010C |
| E281 | | |
| ... | ... | ... |
| FFFE | | |
| FFFF | | |

FIG. 7

METHOD AND APPARATUS FOR GENERATING SELECTED IMAGE VIEWS FROM A LARGER IMAGE HAVING DEPENDENT MACROBLOCKS

CROSS-REFERENCE TO RELATED APPLICATIONS

The present invention is related to U.S. patent application Ser. No. 09/036,140, entitled "Method and Apparatus for Generating Selected Image Views From a Larger Image," and U.S. patent application Ser. No. 09/036,143, entitled "Method and Apparatus for Generating Unlimited Selected Image Views From a Larger Image," filed contemporaneously herewith, assigned to the assignee of the present invention and incorporated by reference herein.

FIELD OF THE INVENTION

The present invention relates to image encoding and decoding techniques, and more particularly, to a method and apparatus for generating a partial image from a larger compressed image (or a plurality of individual images).

BACKGROUND OF THE INVENTION

Due to the limited bandwidth of transmission channels, there are a limited number of bits available for encoding image information, such as image information generated by a camera for transmission to one or more remote users. Thus, there are many image encoding techniques available which encode the image information with as few bits as possible using compression techniques, while still maintaining the quality and intelligibility that are required for a given application.

Remote cameras, such as those used for security applications, traffic monitoring or daycare monitoring, are typically panned by physically moving the camera. In addition to the possibility of a mechanical failure, the utility of such remote cameras is limited in that only one user can control the camera at a time. For multi-user applications, however, such limited user control of the camera view is not practical. A number of software techniques have been developed for permitting a number of users to view selected portions of a larger image (or a composite image generated from a plurality of individual images).

Permitting multiple selected views of a larger image, however, becomes more difficult if the larger image is compressed. Specifically, since image data following image compression is of variable length, pixel boundaries are not readily detectable in a compressed image. In addition, since many encoding techniques exhibit intra-frame pixel dependencies, such as encoding the difference values for adjacent DC coefficients under the JPEG standard, the pixel values must be modified when generating a selected portion of a larger image, to reflect the reordering of the subset of pixels in the selected image view.

Typically, when generating a selected portion of a larger compressed image, the larger image must be decompressed into the pixel domain, before the pixel values are reordered and assembled to create each of the selected image views. Thereafter, each of the selected image views is compressed to form the final images transmitted to each user. The more popular image compression techniques, such as JPEG and MPEG, typically perform three steps to generate a compressed image, namely, (i) transformation, such as a discrete cosine transform (DCT); (ii) quantization; and (iii) run-length encoding (RLE). Likewise, to decompress images using these same image compression techniques, the inverse of the compression steps are performed by the receiver on the compressed image, namely, (i) run-length decode; (ii) dequantization; and (iii) inverse discrete cosine transform (IDCT).

Thus, to create N selected image views from a larger compressed image, conventional techniques require one image decompression, N pixel reorderings, and N compressions.

SUMMARY OF THE INVENTION

Generally, a selected image view generator for generating a selected portion of a larger compressed image is disclosed. The larger compressed image includes a plurality of macroblocks of image data, encoded using an intraframe encoding technique. The macroblocks do not need to be encoded independently. A portion of the DC coefficient values, however, are recomputed when generating the selected image view from the overall image, to reflect the reordering of the pixels in the selected image view (that results in a portion of the pixels being adjacent to different pixels than they were in a subimage).

According to a further aspect of the invention, a selected image view is generated from a larger compressed image having a plurality of macroblocks of image data. Each of the macroblocks contains one or more blocks of data, with each block having a DC coefficient value. Initially, the blocks from the larger compressed image that are included in the selected image view are identified, and then the DC coefficient values are recomputed for each block in the selected image view that is encoded relative to a different block than it was encoded relative to in the larger compressed image. Finally, the identified blocks are assembled to form the selected image view.

According to a further aspect of the invention, multiple users can simultaneously control a selected view received from an image source. Remote cameras can be panned electronically, rather than physically. The overall image may include one or more static or real-time images. The selected image from a larger overall image may be used, for example, with a 360° panning camera, to permit each user to select a desired real-time or static view. For example, for a tennis match, different users can watch different players from the same video feed.

BRIEF DESCRIPTION OF THE DRAWINGS

FIG. 1A illustrates a block diagram of a network environment suitable for transferring information from an image source device to one or more destination devices;

FIG. 1B illustrates a selected image view from an overall larger image;

FIG. 4 illustrates the various categories utilized to encode the coefficient values under the JPEG standard;

FIG. 5 illustrates the DC detection table of FIG. 2;

FIG. 6 illustrates an AC encoding table in accordance with the JPEG standard;

FIG. 7 illustrates the AC detection table of FIG. 2; and

DETAILED DESCRIPTION

Figure 2:
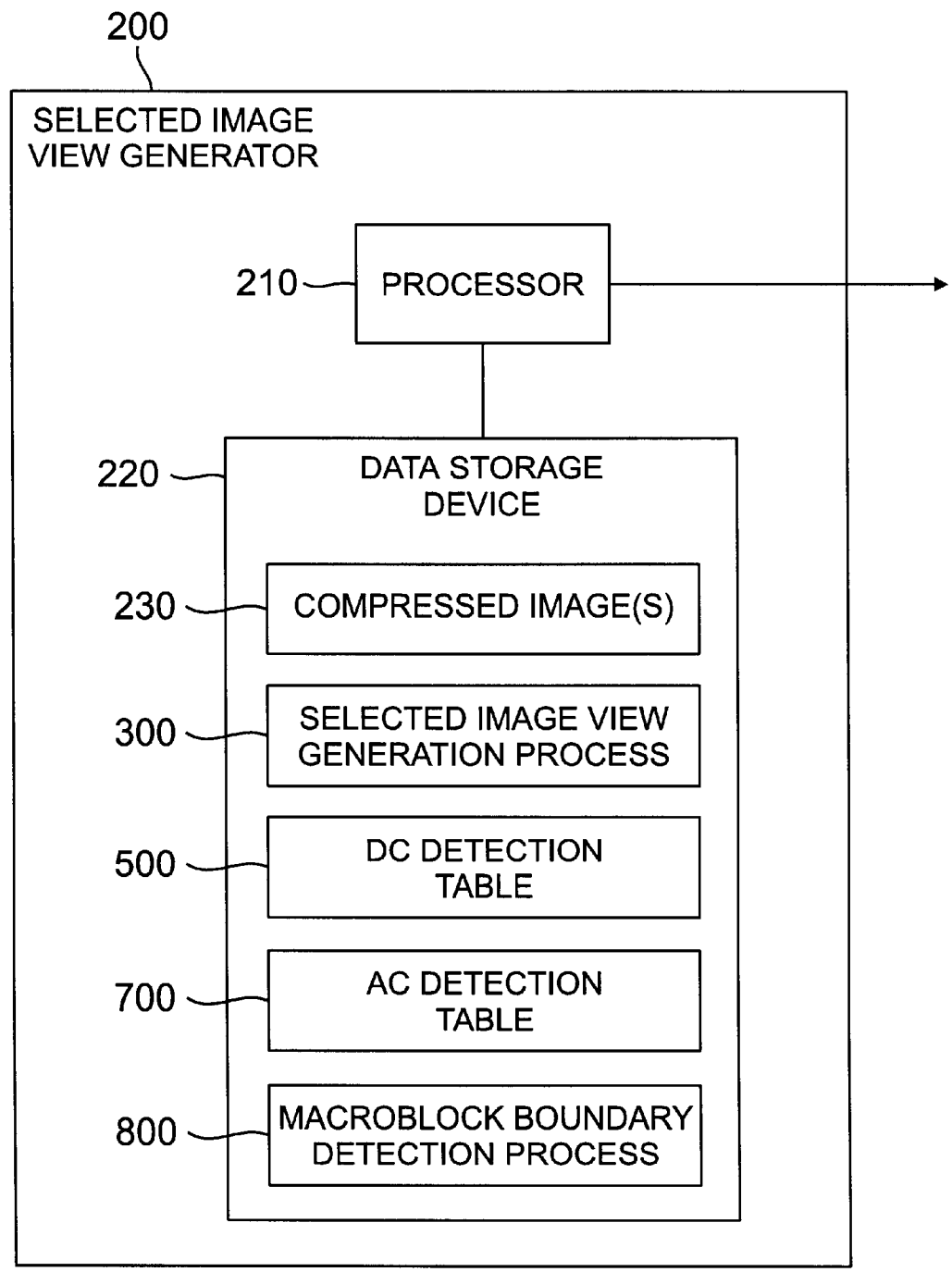
FIG. 2 illustrates one embodiment of the selected image view generator of FIG. 1.

FIG. 1A shows an illustrative network environment 100 for transferring multimedia information, such as image, video, voice or data information, or a combination of the foregoing, between one or more sources and destinations, such as end users 110–113 and an image source 130. As shown in FIG. 1B, each end user 110–113, such as end user 110, desires to view a selected portion 150 of a compressed image 160. The compressed image 160 is generated by one or more image sources, such as image source 130, and may include one or more subimages, such as subimages 160*a*–160*d*. It is noted that each subimage 160*a*–160*d* may be a full independent image. The image source 130 may be embodied, for example, as a 360° camera that produces panoramic images, or one or more cameras generating images that may be combined into a composite image. For a detailed discussion of a suitable 360° camera, see U.S. patent application Ser. No. 08/433,356, entitled "Panoramic Viewing Apparatus," assigned to the assignee of the present invention and incorporated by reference herein.

A selected image view generator 200, discussed further below in conjunction with FIG. 2, generates the selected portion(s) 150 of the image 160, shown in FIG. 1B. In one embodiment, each user receives the overall image 160, as well as the currently selected image view 150. The transmitted overall image 160 provides the user 110 with an orientation and permits the user 110 to select the desired view 150. For one set of video applications, the overall image 160 can be transmitted at a rate below the standard frame rate, and the currently selected image view 150 can be transmitted at the highest rate permitted by the available bandwidth. In one video implementation, the user selects a viewpoint, and whatever passes in the selected viewpoint over time is presented to the user. In a still image implementation, the smaller selected image view 150 can be presented with a higher resolution than the overall image 160 and/or mapped to a larger portion of the display screen.

The selected image view generator 200 may utilize a variety of image inputs, for example, received from a file server, a video-on-demand system or a real-time camera. The network environment 100 may be embodied, for example, as the Public Switched Telephone Network ("PSTN"), the Internet, or other broadband networks, as would be apparent to a person of ordinary skill. In the illustrative embodiment, the end users 110–113 can utilize work stations (not shown), or other general-purpose computing devices.

According to a feature of the present invention, a selected image view 150 from an overall image 160 is generated with significantly reduced computation and reduced latency (for video processing), permitting viewing of live events without noticeable delay. In addition, the present invention permits selected image views 150 to be formed from static images or from a video stream or from a combination of the foregoing. According to a further feature of the present invention, multiple users can simultaneously control a selected view received from the image source 130. In this manner, a user 110 obtains personalized access to the image source 130.

The image 160 is encoded using a suitable intra-frame macroblock-based image encoder, such as a JPEG image encoder or an MPEG intra-frame image encoder. In the illustrative JPEG embodiment, each image 160 consists of macroblocks of pixels. Macroblocks are typically a 16×8 or a 16×16 pixel array. Typically, macroblocks are transmitted sequentially from left to right, top to bottom. Thus, for example, 2400 16×8 macroblocks would constitute an entire 640×480 pixel frame. The macroblocks constitute one or more independent color components, which may be at different resolution levels. In the illustrative JPEG embodiment, each illustrative 16×8 macroblock is represented by 2 luminance (Y) blocks and 2 chrominance ($C_b, C_r$) blocks, with each block containing 1 DC coefficient value, and 63 AC coefficient values.

As discussed further below, many intra-frame encoding techniques, including JPEG and MPEG, encode the difference values for adjacent DC coefficients, as opposed to the absolute DC value. Thus, in accordance with the present invention, a portion of the DC coefficient values are recomputed when generating the selected image view 150 from the overall image 160, to reflect the reordering of the pixels in the selected image view resulting in a portion of the pixels being adjacent to different pixels (than they were in the respective subimage 160*a*–160*d*).

FIG. 2 is a block diagram showing the architecture of an illustrative selected image view generator 200. The selected image view generator 200 preferably includes a processor 210 and related memory, such as a data storage device 220. The processor 210 may be embodied as a single processor, or a number of processors operating in parallel. The data storage device 220 or another memory is operable to store one or more instructions, which the processor 210 is operable to retrieve, interpret and execute.

The data storage device 220 preferably includes an area of memory 230 for storing the compressed image(s) 160. The selected image view generator 200 may receive the compressed image(s) 160 from the image source 130 for processing in real-time or static compressed images may be retrieved from a database of images, such as a video server, as would be apparent to a person of ordinary skill. In addition, as discussed in conjunction with FIGS. 3A and 3B, the data storage device 220 preferably includes a selected image view generation process 300. Generally, the selected image view generation process 300 (i) retrieves the encoded input image data; (ii) retrieves an indication of the image view selected by the user; and (iii) generates and transmits the selected image view 150 to the user.

As discussed further below in conjunction with FIGS. 5 and 7, respectively, the data storage device 220 may also include a DC detection table 500 and an AC detection table 700. The DC detection table 500 and AC detection table 700 preferably store detection information for each codeword. In addition, as discussed further below in conjunction with FIGS. 8A and 8B, the data storage device 220 preferably includes a macroblock boundary detection process 800. Generally, the macroblock boundary detection process 800 evaluates the input image data and decodes the data only enough to identify where each macroblock ends.

Figure 3A:
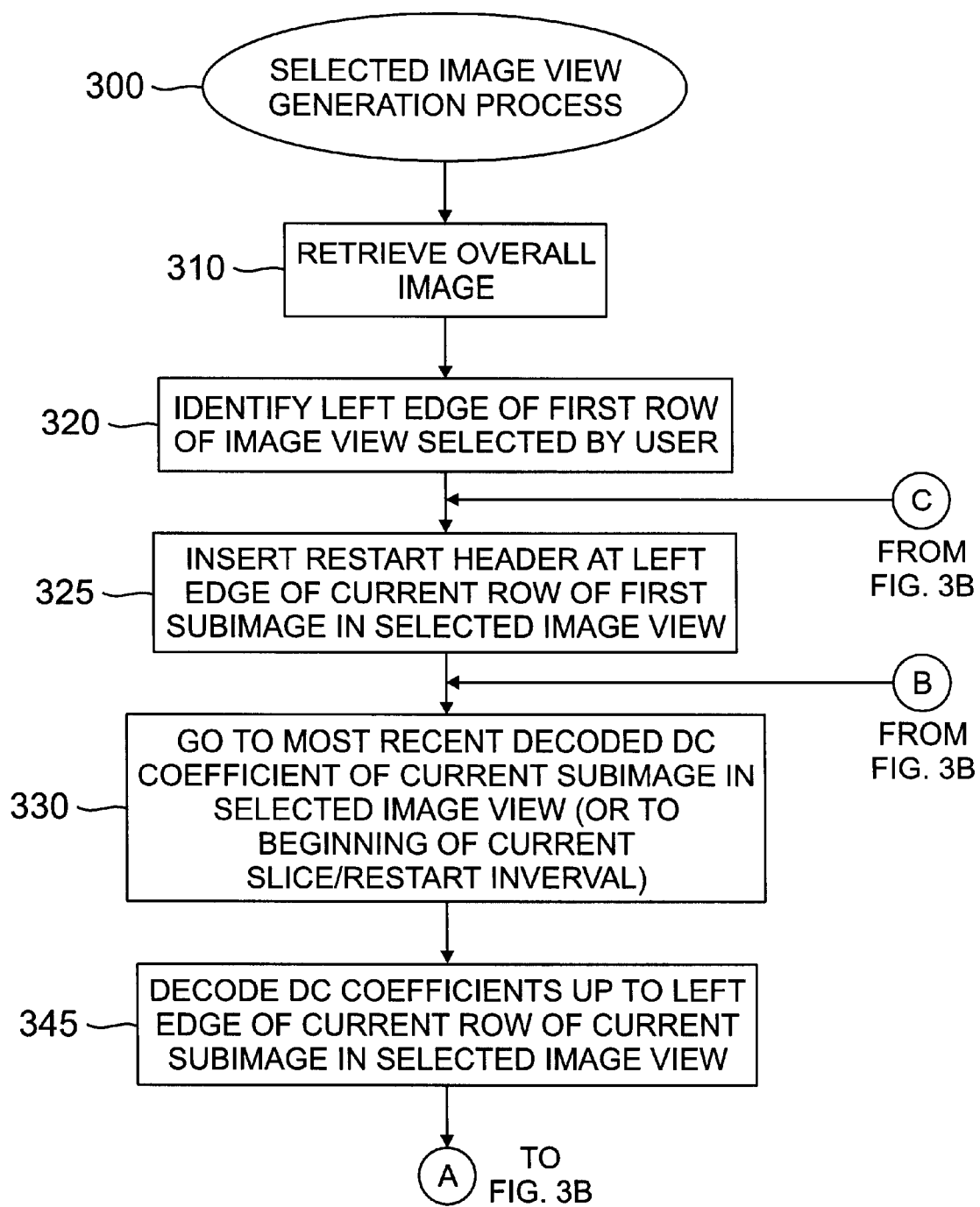
FIGS. 3A and 3B, collectively, are a flow chart describing the selected image view generation process of FIG. 2.
Figure 3B:
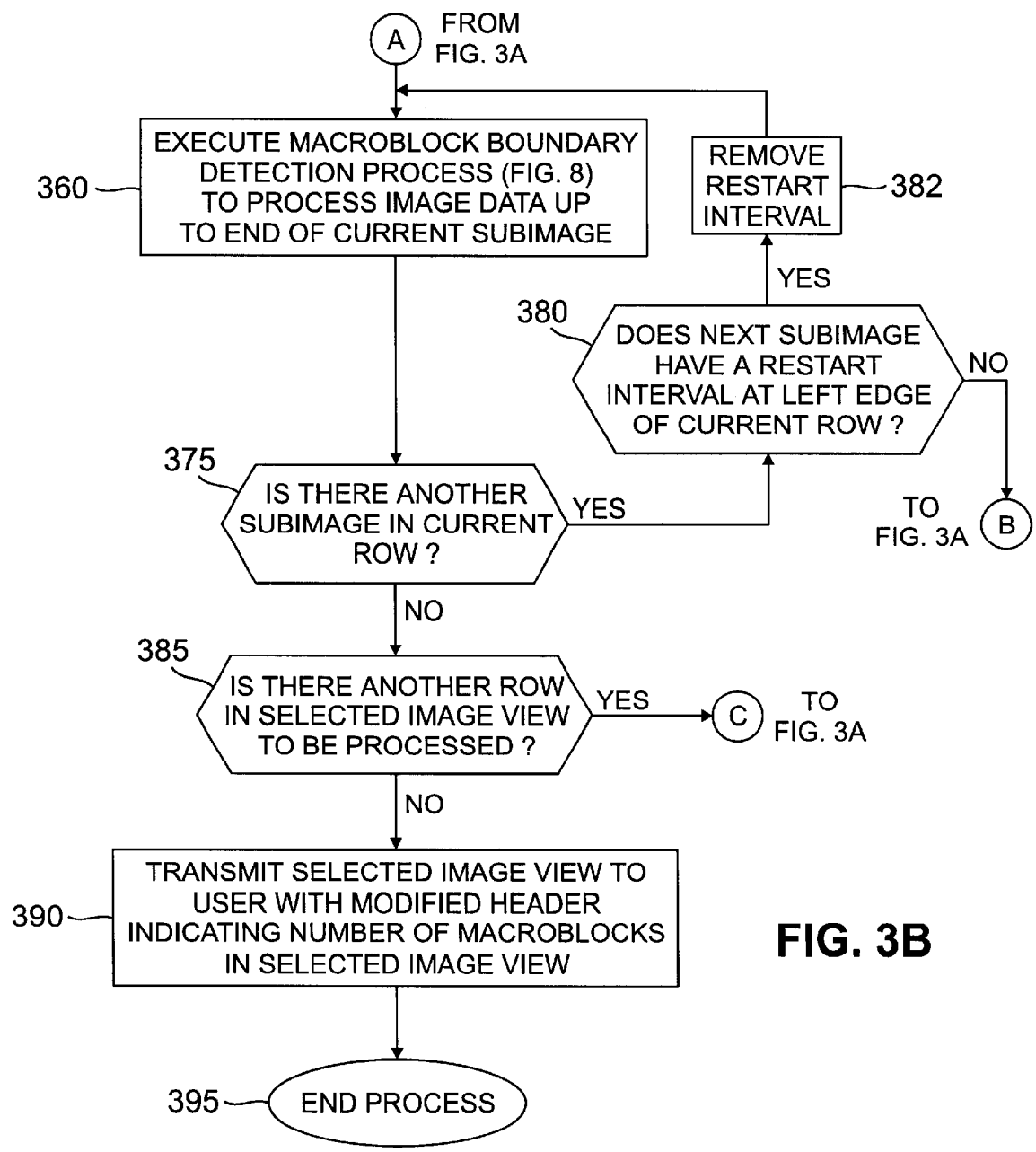

As shown in FIG. 3A, the selected image view generation process 300 initially retrieves the overall image 160 during step 310. The selected image view generation process 300 then identifies the macroblock at the left edge of the first row of the selected image view 150 during step 320. In an illustrative embodiment, a new restart interval (JPEG) or slice (MPEG) is inserted at the beginning of each row in the selected image view 150. Thus, a restart header is preferably inserted at the left edge of the current row of the first subimage 160*a*–160*d* in the selected image view 150 during step 325. In an MPEG implementation, the restart/slice header includes the vertical and horizontal position (or address) of the first macroblock in the slice.

Thereafter, during step 330, the selected image view generation process 300 goes to the closest previous DC coefficient that has been decoded, or to the beginning of the current slice for MPEG images or restart interval for JPEG images, which could be external to the selected image view 150, whichever is closer. In other words, the selected image view generation process 300 returns to the preceding closest macroblock during step 330 having a known absolute DC value. For the first pass through the selected image view generation process 300, however, when the first row of the selected image view 150 is being processed, no DC coefficients have been decoded and stored by the selected image view generation process 300. Thus, the selected image view generation process 300 will go to the beginning of the slice/restart interval containing the first macroblock in the selected image view 150. The DC coefficients up to the left edge of the current row of the current subimage 160a–d in the selected image view 150 are then decoded during step 340. In one embodiment, the absolute DC coefficient values are stored as they are decoded for each subimage, so that the DC coefficient of the right-most macroblock in one row can be used during step 330 (on the subsequent pass of the selected image view generation process 300) for the subsequent row.

In order to recompute the appropriate DC coefficient values to reflect the reordering of certain pixels in the selected image view 150 (resulting in a portion of the pixels being adjacent to different pixels than they were in a subimage) and to detect macroblock boundaries, the selected image view generation process 300 preferably executes a macroblock boundary detection process 800 (FIGS. 8A and 8B) during step 360. As discussed below in conjunction with FIGS. 8A and 8B, the macroblock boundary detection process 800 will process the image data in a given row of the selected image view 150 up to the end of the current subimage.

A test is then performed during step 375 to determine if there is another subimage 160a–160d in the current row. If it is determined during step 375 that there is another subimage 160a–160d in the current row, then a further test is performed during step 380 to determine if the next subimage 160a–160d has a restart interval at the left edge of the current row. It is noted that the test performed during step 380 addresses the requirement in a JPEG implementation that each restart interval includes the same number of macroblocks, by ensuring that the size of each restart interval is equal to the length of each row in the selected image view 150. It may be desirable in an MPEG implementation to include multiple restart/slice intervals in each row, by placing a new restart/slice interval at the beginning of each row of each individual subimage in the selected image view 150.

If it is determined during step 380 that the next subimage 160a–160d does not have a restart interval at the left edge of the current row, then program control returns to step 330 (FIG. 3A) and continues processing the image data in the manner described above. If, however, it is determined during step 380 that the next subimage 160a–160d does have a restart interval at the left edge of the current row, then the restart interval is removed during step 382 before program control returns to step 360, in the manner described above.

If, however, it is determined during step 375 that there is not another subimage 160a–160d in the current row, then a further test is performed during step 385 to determine if there is another row in the selected image view 150 to be processed. If it is determined during step 385 that there is another row in the selected image view 150 to be processed, then program control returns to step 325 (FIG. 3A) to process the next row, in the manner described above.

If, however, it is determined during step 385 that there is not another row in the selected image view 150 to be processed, then the selected image view 150 is transmitted to the user during step 390 with a modified frame header indicating the number of macroblocks in the selected image view 150, before program control terminates during step 395.

JPEG Decoding

Under the JPEG standard, the AC and DC coefficients are coded in a different manner. For a detailed discussion of JPEG encoding, see William B. Pennebaker and Joan L. Mitchell, JPEG Still Image Data Compression Standard (Ban Nostrand Reinhold, 1993), incorporated by reference herein. Generally, the DC coefficient is a multiple of the average value in the 8×8 block. Since the average pixel value in any 8×8 block will not differ substantially from the average value in a neighboring block, the DC coefficient values will typically not vary significantly. Thus, in order to achieve further bit rate reductions in the JPEG standard, the differences between adjoining coefficients are typically encoded rather than the coefficients themselves.

In addition, the possible values that the encoded DC difference values can take in the JPEG standard are partitioned into categories, shown in FIG. 4. As shown in FIG. 4, the number of elements within each category grows by a power of two. For example, category 0 has only one member, category 1 has two members and category 2 has four members. The category numbers are then Huffman coded. The particular element within each category is specified by adding additional bits to the end of the Huffman code for a given category. Since category 1 has two members, it can be differentiated using one additional bit. In general, category n has $2^n$ members and can be differentiated using n additional bits.

For example, category 3 has eight values $\{-7, -6, -5, -4, 4, 5, 6, 7\}$. Thus, if the DC difference values between two adjacent blocks is 5, the Huffman code for category 3 is transmitted, as well as three bits to differentiate which of the eight values in category 3 was transmitted. Thus, in order for the receiver to decode the transmitted information, a DC decode table 500, shown in FIG. 5, is typically accessed. As shown in FIG. 5, data is read in eight bit chunks, and the DC detection information provided in FIG. 5 indicates the number of additional bits to read to derive the particular element within the identified category. In this manner, the DC difference value is obtained. According to a feature of the present invention, discussed further below in conjunction with FIG. 5, the DC difference values of each block in each individual compressed image are decoded using the decode table 500 before generating the multi-image composite, so that the DC difference values at the border of each individual image may be recalculated to reflect the reordering of the pixels, in the manner described above.

Due to the quantization and thresholding performed on the transformed values, many of the AC coefficients are zero. Thus, the JPEG standard achieves significant further bit rate reductions by implementing run-length encoding on the AC coefficients. Thus, in addition to encoding a category, as well as the additional bits to differentiate a particular member within a given category, in a similar manner to the DC difference values discussed above, the number of non-zero AC coefficients since the last non-zero coefficient is also encoded. As shown in FIG. 6, the category of the non-zero coefficient to be encoded, and the "run", or the number of zero coefficients preceding the current non-zero coefficient, form a pointer to a specific Huffman code. It is noted that since category n has $2^n$ members and can be differentiated using n additional bits, the category number indicates the number of additional bits. Thus, the Huffman code for a coefficient in category n is followed by n additional bits. The encoded information is therefore the to consist of a run/length, where the run is the number of coefficients having a zero value preceding the current non-zero coefficient, and the length is the number of additional bits to differentiate the particular member within a given category.

As previously indicated, the AC coefficients are only decoded enough to permit counting of the coefficients until 63 AC coefficients have been processed, or an end-of-block code has been detected. In a JPEG implemention, for example, the AC coefficients are variable-length decoded and run length decoded. Thus, in order to generate the selected image view 150 without fully decoding each codeword, an AC detection table 700, shown in FIG. 7, is utilized which returns detection information for each codeword. Since luminance and chrominance values are encoded differently and separately to take advantage of differences in human sensitivity to each, using an n-tuple representation of a color image, such as a 3-tuple representation consisting of one luminance (Y) image and 2 chrominance ($C_b, C_r$) images, the AC detection table 700 preferably maintains separate columns for each. The AC detection table 700 is derived from the AC encoding table 600, shown in FIG. 6, and translates each codeword in the input image into the number of coefficients encoded (the current coefficient plus preceding zero coefficients) and the total number of bits (number of bits in the codeword, plus the number of additional bits).

As shown in FIG. 7, 16-bit codes are utilized as an index into the AC detection table 700. Thus, there are 64K entries in the illustrative table 700. Each row consists of two (2) bytes of luminance detection information and two (2) bytes of chrominance detection information, in a hexadecimal notation. The upper byte of each two (2) bytes of detection information indicates the number of coefficients encoded (the current coefficient plus preceding zero coefficients) and the lower byte indicates the total number of bits (number of bits in the codeword, plus the number of additional bits). As discussed below in conjunction with FIG. 8, the number of coefficients encoded is utilized to increment a counter, until the total block of 63 AC coefficients has been processed (or an end of block is detected). The total numbers of bit is utilized to shift the bits to the next codeword in the stream.

Figure 8A:
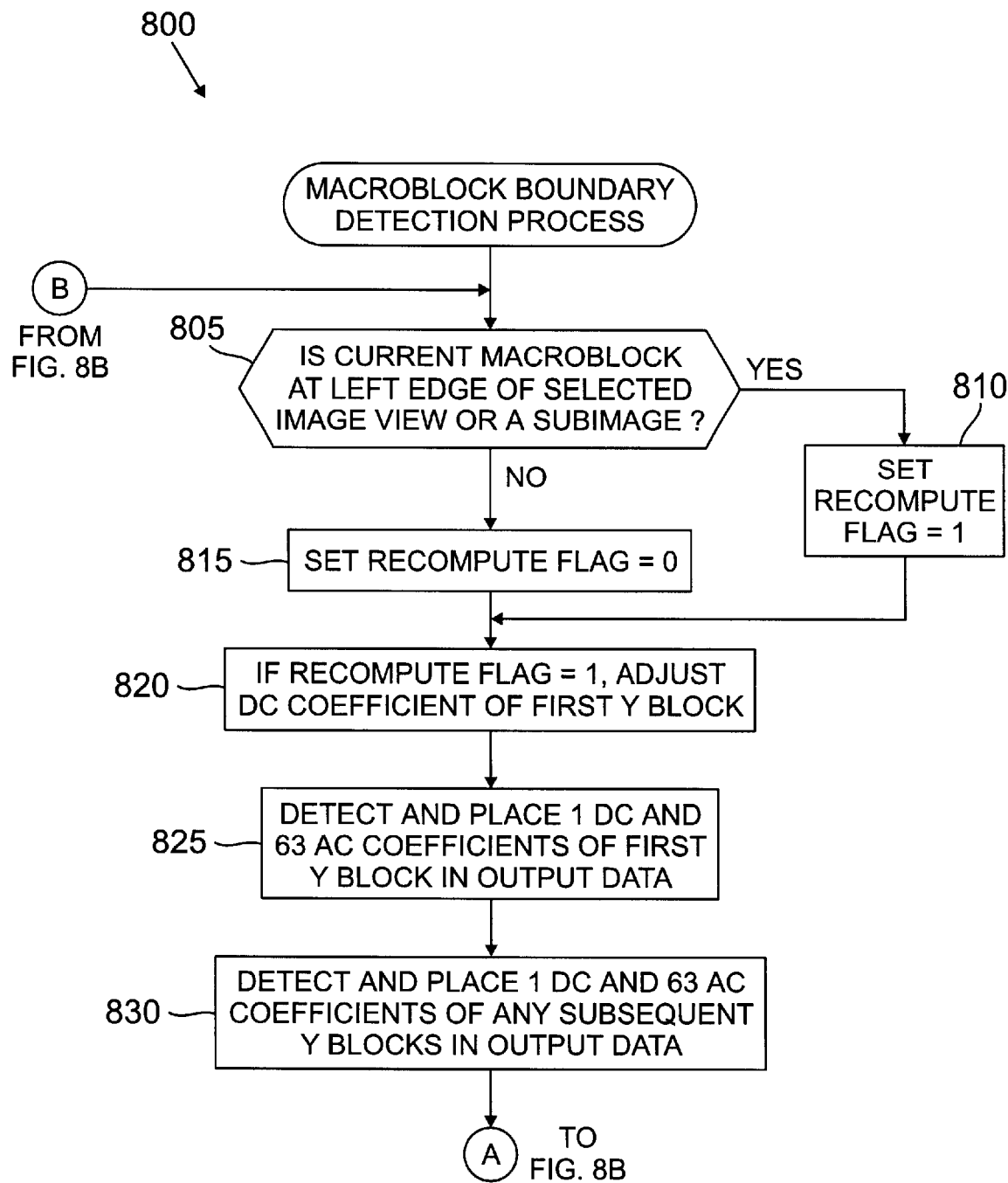
FIGS. 8A and 8B, collectively, are a flow chart describing an exemplary macroblock boundary detection process of FIG. 2.
Figure 8B:
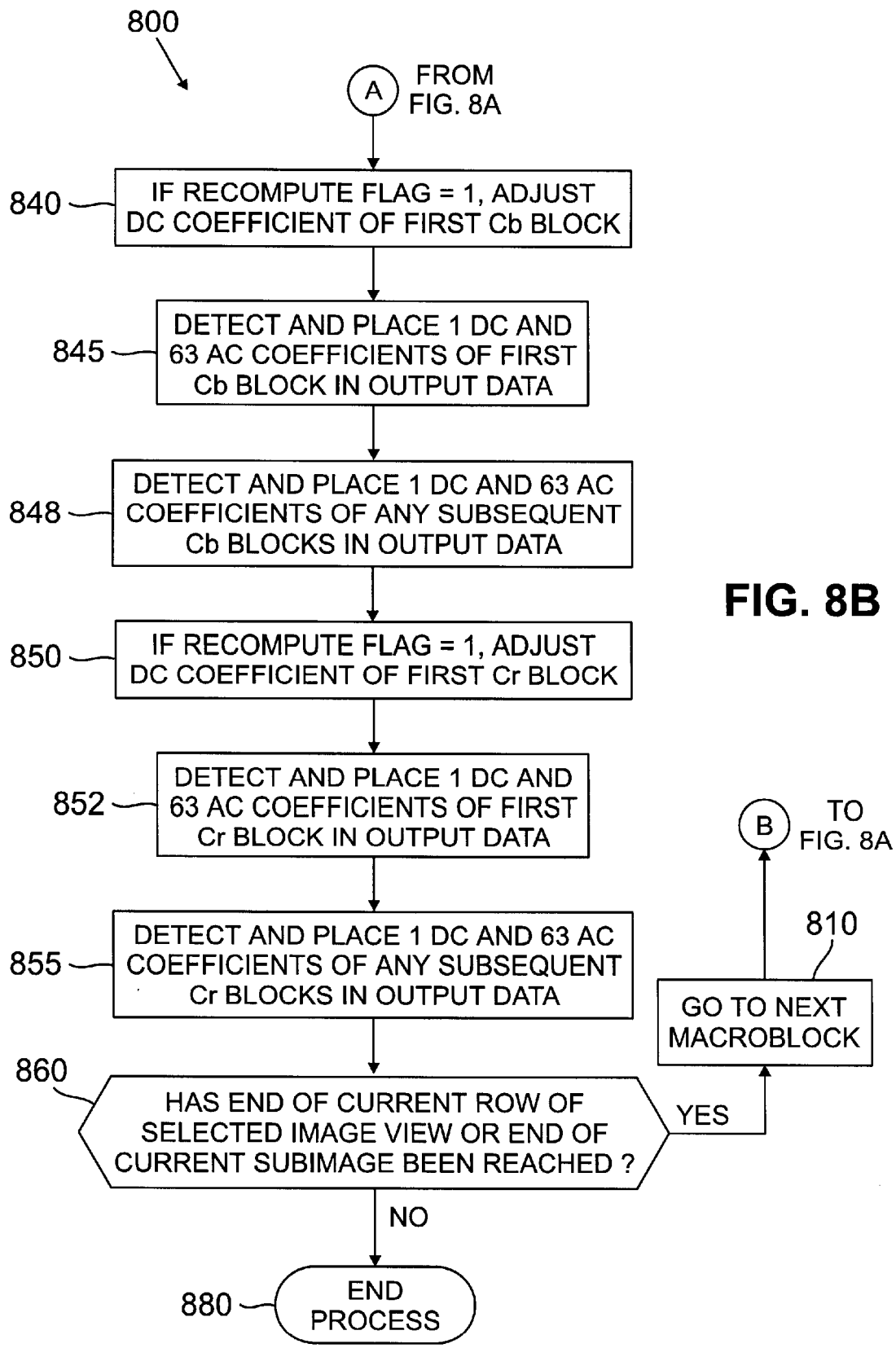

As discussed above, the composite image generator 200 preferably executes a macroblock boundary detection process 800, shown in FIGS. 8A and 8B, to evaluate the input image data and decode the data only enough to identify where each macroblock ends. The macroblock boundary detection process 800 is executed by the selected image view generation process 300 for each subimage in each row of the selected image view 150. As shown in FIG. 8A, the macroblock boundary detection process 800 initially performs a test during step 805 to determine if the current macroblock is at the left edge of the selected image view 150 or the left edge of a subimage 160a–160d. As previously indicated, a restart interval is preferably inserted only at the beginning of each row in the selected image view 150, and any additional restart intervals in a given row are removed by the selected image view generation process 300, discussed above. Thus, the DC coefficients of the macroblocks at the left edge of the selected image view 150 (following the new restart intervals) will have to be recomputed to provide their absolute value, as opposed to their differential value relative to the previous DC coefficient in the subimage. In addition, the DC coefficients of the macroblocks at the left edge of additional subimages (other than the first subimage) in the selected image view 150 will have to be recomputed as well. If a restart interval was removed from an additional subimage, the DC coefficients of the macroblocks at the left edge of the respective additional subimage are recomputed to provide their differential value relative to the previous DC coefficient in the previous subimage, as opposed to the absolute value that was provided with the removed restart interval. If a restart interval was not removed from an additional subimage, the DC coefficients of the macroblocks at the left edge of the respective additional subimage are recomputed to provide their new differential value relative to the previous DC coefficient in the previous subimage.

If it is determined during step 805 that the current macroblock is at the left edge of the selected image view 150 or the left edge of a subimage 160a–160d, then a recompute flag is set to one during step 810, so that the appropriate DC coefficients in the macroblock can be recomputed. If, however, it is determined during step 805 that the current macroblock is not at the left edge of the selected image view 150 or the left edge of a subimage 160a–160d, then a recompute flag is set to zero during step 815, so that the DC coefficients in the macroblock are not recomputed.

Thereafter, the DC coefficient in the first Y block is recomputed during step 820, if the recompute flag has a value of one. The DC coefficient and 63 AC coefficients associated with the first Y block are then detected and placed in the output data during step 825. It is noted that the recomputed DC values will cause bit shifting in the data, so when the coefficients are placed in the output data the bits must be shifted and it is not a simple copy.

It is further noted that if a macroblock contains more than one luminance or chrominance block of the same color, only the first DC coefficient of a given color has to be recomputed. Thus, the DC coefficient for subsequent Y blocks, if any, in the illustrative embodiment are not recomputed, and the DC coefficient and 63 AC coefficients of subsequent Y blocks, if any, are detected and placed in the output data during step 830.

The DC coefficient in the first Cb block is recomputed during step 840 (FIG. 8B), if the recompute flag has a value of one. The DC coefficient and 63 AC coefficients associated with the first Cb block are then detected and placed in the output data during step 845. The DC coefficient for subsequent Cb, if any, blocks are not recomputed, and the DC coefficient and 63 AC coefficients of subsequent Cb blocks, if any, are detected and placed in the output data during step 848.

The DC coefficient in the first Cr block is recomputed during step 850, if the recompute flag has a value of one. The DC coefficient and 63 AC coefficients associated with the first Cr block are then detected and placed in the output data during step 852. The DC coefficient for subsequent Cr blocks, if any, are not recomputed, and the DC coefficient and 63 AC coefficients of subsequent Cr blocks, if any, are detected and placed in the output data during step 855.

A test is then performed during step 860 to determine if the end of the current row of the selected image view 150 or the end of the current subimage 160a–160d has been reached. If it is determined during step 860 that the end of the current row of the selected image view 150 or the end of the current subimage 160a–160d has not been reached, then the next macroblock in the selected image view 150 is obtained during step 870 before program control returns to step 805 for processing of the next macroblock in the manner described above.

If, however, it is determined during step 860 that the end of the current row of the selected image view 150 or the end of the current subimage 160a–160d has been reached, then program control terminates during step 880.

It is to be understood that the embodiments and variations shown and described herein are merely illustrative of the principles of this invention and that various modifications may be implemented by those skilled in the art without departing from the scope and spirit of the invention.

We claim:

1. A method of generating a selected image view from a larger compressed image encoded using an intraframe encoding technique, the larger compressed image being made up of at least a plurality of macroblocks of image data, each of the macroblocks containing one or more blocks of data, the method comprising the steps of:

receiving a user selection of an area of said larger compressed image to be included in said selected image view;

identifying the blocks from the larger compressed image included in the selected image view identified in said user selection, each of the blocks having a DC coefficient value;

recomputing the DC coefficient value for each block in the selected image view that is to be encoded relative to a different block than it was encoded relative to in the larger compressed image; and forming the selected image view from the identified blocks.

2. The method according to claim 1, further comprising the step of transmitting the selected image view to a user.

3. The method according to claim 1, further comprising the step of including a header with the selected image view indicating the number of the macroblocks in the selected image view.

4. The method according to claim 1, wherein the intraframe encoding technique is JPEG.

5. The method according to claim 1, wherein the intraframe encoding technique is MPEG.

6. The method according to claim 1, wherein the larger compressed image is a panoramic view.

7. The method according to claim 1, further comprising the step of recomputing the DC coefficient value to an absolute value for each block that is at the left edge of the selected image view.

8. The method according to claim 1, further comprising the step of recomputing the DC coefficient value from an absolute value to a differential value for each block that immediately followed a restart interval in the larger compressed image but not in the selected image view.

9. The method according to claim 1, further comprising the step of recomputing the DC coefficient value to a new differential value for each of the blocks that is differentially encoded relative to a different block than it was encoded relative to in the larger compressed image.

10. The method according to claim 1, wherein the larger compressed image is one image frame in a video stream.

11. The method according to claim 10, wherein the content in the selected image view can change with each frame of the video stream.

12. A method of generating a selected image view from a larger compressed image encoded using an intraframe encoding technique, the larger compressed image being made up of at least a plurality of macroblocks of image data, each of the macroblocks including one or more blocks of data, the method comprising the steps of:

receiving a user selection of an area of said larger compressed image to be included in said selected image view;

identifying the blocks from the larger compressed image included in the selected image view identified in said user selection, each of the blocks having a DC coefficient value;

decoding the image data only enough to detect where each of the blocks end;

recomputing the DC coefficient value for each block in the selected image view that is to be encoded relative to a different block than it was encoded relative to in the larger compressed image; and assembling the identified blocks to form the selected image view.

13. The method according to claim 12, further comprising the step of transmitting the selected image view to a user.

14. The method according to claim 12, further comprising the step of including a header with the selected image view indicating the number of the macroblocks in the selected image view.

15. The method according to claim 12, wherein the intraframe encoding technique is JPEG.

16. The method according to claim 12, wherein the intraframe encoding technique is MPEG.

17. The method according to claim 12, further comprising the step of recomputing the DC coefficient value to an absolute value for each block that is at the left edge of the selected image view.

18. The method according to claim 12, further comprising the step of recomputing the DC coefficient value from an absolute value to a differential value for each block that immediately followed a restart interval in the larger compressed image but not in the selected image view.

19. The method according to claim 12, further comprising the step of recomputing the DC coefficient value to a new differential value for each of the blocks that is differentially encoded relative to a different block than it was encoded relative to in the larger compressed image.

20. The method according to claim 12, wherein the larger compressed image is one image frame in a video stream.

21. The method according to claim 20, wherein the content in the selected image view can change with each frame of the video stream.

22. A selected image view generator for generating a selected image view from a larger compressed image encoded using an intraframe encoding technique, the larger compressed image being made up of at least a plurality of blocks of image data, comprising:

an input for receiving a user selection of the selected image view within the larger compressed image from a user; and a processor to:

(i) identify the blocks from the larger compressed image included in the selected image view, each of the blocks having a DC coefficient value;

(ii) recompute the DC coefficient value for each block in the selected image view that is encoded relative to a different block than it was encoded relative to in the larger compressed image; and (iii) assemble the identified blocks to form the selected image view.

23. The selected image view generator according to claim 22, further comprising means for transmitting the selected image view to a user.

24. The selected image view generator according to claim 22, wherein the processor includes a header with the selected image view indicating the number of the macroblocks in the selected image view.

25. The selected image view generator according to claim 22, wherein the intraframe encoding technique is JPEG.

26. The selected image view generator according to claim 22, wherein the intraframe encoding technique is MPEG.

27. The selected image view generator according to claim 22, wherein the processor recomputes the DC coefficient value to an absolute value for each block that is at the left edge of the selected image view.

28. The selected image view generator according to claim 22, wherein the processor recomputes the DC coefficient value from an absolute value to a differential value for each block that immediately followed a restart interval in the larger compressed image but not in the selected image view.

29. The selected image view generator according to claim 22, wherein the processor recomputes the DC coefficient value to a new differential value for each of the blocks that is differentially encoded relative to a different block than it was encoded relative to in the larger compressed image.

30. The selected image view generator according to claim 22, wherein the larger compressed image is one image frame in a video stream.

31. The selected image view generator according to claim 22, wherein the content in the selected image view can change with each frame of the video stream.

32. The selected image view generator according to claim 22, further comprising a data storage device for storing the larger compressed image.

33. A selected image view generator for generating a selected image view from a larger compressed image encoded using an intraframe encoding technique, the larger compressed image being made up of at least a plurality of blocks of image data, comprising:

means for receiving a user selection of the selected image view within the larger compressed image from a user;

means for identifying the blocks from the larger compressed image included in the selected image view, each of the blocks having a DC coefficient value;

means for recomputing the DC coefficient value for each block in the selected image view that is encoded relative to a different block than it was encoded relative to in the larger compressed image; and means for assembling the identified blocks to form the selected image view.

34. The selected image view generator according to claim 33, further comprising means for transmitting the selected image view to a user.

35. The selected image view generator according to claim 33, further comprising means for including a header with the selected image view indicating the number of the macroblocks in the selected image view.

36. The selected image view generator according to claim 33, wherein the intraframe encoding technique is JPEG.

37. The selected image view generator according to claim 33, wherein the intraframe encoding technique is MPEG.

38. The selected image view generator according to claim 33, further comprising means for recomputing the DC coefficient value to an absolute value for each block that is at the left edge of the selected image view.

39. The selected image view generator according to claim 33, further comprising means for recomputing the DC coefficient value from an absolute value to a differential value for each block that immediately followed a restart interval in the larger compressed image but not in the selected image view.

40. The selected image view generator according to claim 33, further comprising means for recomputing the DC coefficient value to a new differential value for each of the blocks that is differentially encoded relative to a different block than it was encoded relative to in the larger compressed image.

41. The selected image view generator according to claim 33, wherein the larger compressed image is one image frame in a video stream.

42. The selected image view generator according to claim 41, wherein the content in the selected image view can change with each frame of the video stream.

43. The selected image view generator according to claim 33, further comprising means for storing the larger compressed image.

44. A method of transmitting a selected image view from a larger compressed image to a user, the larger compressed image being made up of at least a plurality of macroblocks of image data, the method comprising the steps of:

transmitting the larger compressed image to a user at a first rate;

receiving a selection of a selected image view within the larger compressed image from a user;

decoding the larger compressed image only enough to detect the macroblocks from the larger compressed image included in the selected image view; and transmitting the identified macroblocks to the user at a second rate to form the selected image view, the second rate being faster than the first rate.

* * * * *